US010582445B2

(12) United States Patent
Ashwood-Smith et al.

(10) Patent No.: US 10,582,445 B2
(45) Date of Patent: Mar. 3, 2020

(54) METHOD FOR DYNAMICALLY SLICING MOBILE DEVICES

(71) Applicants: Peter Ashwood-Smith, Gatineau (CA); Tao Wan, Ottawa (CA)

(72) Inventors: Peter Ashwood-Smith, Gatineau (CA); Tao Wan, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 333 days.

(21) Appl. No.: 15/057,754

(22) Filed: Mar. 1, 2016

(65) Prior Publication Data
US 2017/0257823 A1    Sep. 7, 2017

(51) Int. Cl.
| | | |
|---|---|---|
| *H04W 48/18* | (2009.01) | |
| *H04B 17/12* | (2015.01) | |
| *H04B 17/345* | (2015.01) | |

(52) U.S. Cl.
CPC ............ *H04W 48/18* (2013.01); *H04B 17/12* (2015.01); *H04B 17/345* (2015.01)

(58) Field of Classification Search
CPC .............................. H04W 48/18; H04B 17/345
See application file for complete search history.

(56) References Cited

U.S. PATENT DOCUMENTS

| | | | | |
|---|---|---|---|---|
| 7,483,395 B2 * | 1/2009 | Iwanaga | ............ | H04L 12/4675 370/252 |
| 7,499,691 B1 * | 3/2009 | Dunn | .................. | H04B 7/0814 455/101 |
| 7,944,854 B2 * | 5/2011 | Akhter | ................ | H04L 41/0803 370/254 |
| 8,031,633 B2 * | 10/2011 | Bueno | .................. | H04L 12/467 370/254 |

(Continued)

FOREIGN PATENT DOCUMENTS

| | | |
|---|---|---|
| CN | 103634830 A | 3/2014 |
| CN | 103634864 A | 3/2014 |

(Continued)

OTHER PUBLICATIONS

NTT Docomo: "Solution to support a UE with simultaneous connections to multiple Network Slices"., 3GPP Draft; S2-161043, SolutionMultipleNetworkSliceConnection, vol. SA WG2, No. Sophia Antipolis, France, 20160223-20160226, Feb. 22, 2016, XP051078030, 4 pages.

*Primary Examiner* — Jael M Ulysse

(57) ABSTRACT

Aspects of the invention pertain to methods and devices that allow user equipment (UE), such as for example wireless devices, to reconfigure their respective antennas in a dynamic manner to allow connection to additional or fewer logical networks, also being referred to as network slices. Changing the configuration of the array of antennas may include changing an existing configuration, or allocation, of (Continued)

the antennas that are currently communicating with a first number of logical networks into a different configuration of antennas for communicating with a second, different second number of logical networks. In some cases this may mean that antennas that were allocated for communicating with a primary logical network are re-allocated for communicating with a second logical network, with other antennas remaining in communication with the primary logical network.

18 Claims, 6 Drawing Sheets

(56) References Cited

U.S. PATENT DOCUMENTS

| | | | | |
|---|---|---|---|---|
| 8,315,237 B2* | 11/2012 | Berger | | H04W 4/90 370/338 |
| 2009/0168701 A1* | 7/2009 | White | | H04L 12/5692 370/328 |
| 2009/0215404 A1* | 8/2009 | Kesavan | | H04W 48/18 455/73 |
| 2009/0247094 A1* | 10/2009 | Sakoda | | H04W 16/14 455/78 |
| 2010/0039936 A1* | 2/2010 | Jin | | H04L 47/10 370/230 |
| 2010/0296487 A1* | 11/2010 | Karaoguz | | H04W 84/045 370/332 |
| 2011/0070885 A1* | 3/2011 | Ruuska | | H04W 16/14 455/434 |
| 2011/0286437 A1* | 11/2011 | Austin | | H04W 4/02 370/338 |
| 2012/0147772 A1* | 6/2012 | Kazmi | | H04L 5/0078 370/252 |
| 2012/0207032 A1* | 8/2012 | Chen | | H04W 28/18 370/252 |
| 2012/0233302 A1* | 9/2012 | Kallin | | H04L 41/5025 709/221 |
| 2013/0072204 A1* | 3/2013 | Picker | | H04W 88/10 455/450 |
| 2013/0089039 A1* | 4/2013 | Vashi | | H04W 72/02 370/329 |
| 2013/0109370 A1* | 5/2013 | Rowson | | H04W 8/22 455/418 |
| 2013/0208604 A1* | 8/2013 | Lee | | H04L 25/0226 370/252 |
| 2013/0242763 A1* | 9/2013 | Li | | H04W 24/02 370/252 |
| 2013/0303114 A1* | 11/2013 | Ahmad | | H04W 16/14 455/406 |
| 2014/0086177 A1* | 3/2014 | Adjakple | | H04W 12/08 370/329 |
| 2014/0128088 A1* | 5/2014 | Farhadi | | H04W 16/16 455/452.1 |
| 2014/0140224 A1* | 5/2014 | Hakansson | | H04B 7/0608 370/252 |
| 2014/0194118 A1 | 7/2014 | Liu | | |
| 2014/0206414 A1* | 7/2014 | Oh | | H04B 7/0404 455/562.1 |
| 2015/0065127 A1* | 3/2015 | Mutya | | H04W 48/16 455/434 |
| 2015/0065188 A1* | 3/2015 | Nukala | | H04W 52/241 455/522 |
| 2015/0092573 A1* | 4/2015 | Zhang | | H04W 72/10 370/252 |
| 2015/0281973 A1* | 10/2015 | Svedman | | H04B 7/0691 455/454 |
| 2015/0365839 A1* | 12/2015 | Beerends | | H04W 24/08 370/252 |
| 2016/0007268 A1* | 1/2016 | Jung | | H04W 48/08 370/338 |
| 2016/0050618 A1* | 2/2016 | Kollu | | H04W 48/18 455/418 |
| 2016/0234819 A1* | 8/2016 | da Silva | | H04L 41/5054 |
| 2016/0242182 A1* | 8/2016 | Chen | | H04B 7/04 |
| 2017/0164349 A1* | 6/2017 | Zhu | | H04W 48/18 |
| 2017/0339567 A1* | 11/2017 | Li | | H04W 16/02 |

FOREIGN PATENT DOCUMENTS

| | | |
|---|---|---|
| CN | 103648136 A | 3/2014 |
| EP | 2744120 A2 | 6/2014 |
| NO | WO2014096955 A1 | 6/2014 |

* cited by examiner

METHOD FOR DYNAMICALLY SLICING MOBILE DEVICES

FIELD OF THE DISCLOSURE

This application relates to wireless communication, and more particularly to a system and method for allocating antennas for accessing multiple logical networks.

BACKGROUND

Currently, wireless devices, also referred to as user equipment (UE), have one or several antennas, which connect to one or more wireless networks in relatively static fashion. Such connections may be fixed, for example, during manufacturing of the UE. In a particular scenario, a first antenna or set of antennas is designated to connect to Radio Access Technology (RAT), a second antenna or set of antennas is designated to connect to a global positioning system (GPS) and a third antenna or set of antennas is designated to connect to a Wi-Fi access point. The antennas are used to connect to their respective networks and the respective antennas cannot be used to connect to a different network or system. For example, the antenna used for connection to the RAT cannot be used to connect to the GPS network, or vice versa.

In 5G telecommunication systems, it is envisioned that the UE could have an array of antennas, and a wireless network with which the UE communicates could be arranged, or sliced, into a number of logical networks, each having distinct characteristics. For example, one logical network (also referred to as a network slice) might have characteristics including low bandwidth, long range reception between a base station (or access station) and UE, and support high speed of movement of the UE with respect to the base station, while another logical network might have characteristics including high bandwidth, low range reception between the base station and the UE, and support a low speed of movement of the UE with respect to the base station.

SUMMARY OF THE DISCLOSURE

According to an embodiment of the disclosure there is provided a method in a user equipment (UE), the method comprising the UE communicating with a network including a plurality of logical networks. The UE communicates with a first logical network of the plurality of logical networks using a plurality of antennas of the UE. The UE communicates with the first logical network with a first set of antennas and communicates with a second logical network of the plurality of logical networks with a second set of antennas, wherein the first set of antennas includes at least one of the plurality of antennas of the UE and the second set of antennas includes at least one of the plurality of antennas of the UE, the antennas of the first set not being included in the antennas of the second set.

According to another embodiment of the disclosure there is provided a user equipment (UE) comprising a plurality of antennas, the plurality of antennas being configured to communicate with one or more logical networks. The UE also includes a processor and a computer-readable medium having stored thereon instructions that when executed by the processor cause the UE to: communicate with a first logical network using a subset of the plurality of antennas of the UE; and communicate with the first logical network with a first set of antennas and communicating with a second logical network with a second set of antennas, the first set of antennas includes at least one of the subset of the plurality of antennas and the second set of antennas includes at least one of the subset of the plurality of antennas, the antennas of the first set not being included in the antennas of the second set.

According to yet another embodiment of the disclosure there is provided a method comprising a network-side controller receiving an indication of a proposed antenna allocation for a user equipment (UE), wherein the network-side controller is in a network comprising at least a first logical network and a second logical network of a plurality of logical networks, the first logical network communicating with a first set of antennas and the second logical network communicating with a second set of antennas based on the proposed antenna allocation, and the first logical network and the second logical network communicating with different antennas. The method also comprises the network-side controller sending a message for the UE to allocate the plurality of antennas based on the proposed antenna allocation.

According to another embodiment of the disclosure, there is provided a network-side controller for configuring antennas of a user equipment (UE) having a plurality of antennas, the network-side controller comprises a processor and a computer-readable medium having stored thereon instructions that when executed by the processor cause the network-side controller to: receive an indication of a proposed antenna allocation for the UE, wherein the network-side controller is in a network comprising at least a first logical network and a second logical network of a plurality of logical networks, the proposed antenna allocation for the first logical network to communicate with a first set of antennas and the second logical network to communicate with a second set of antennas, wherein the first logical network and the second logical network communicate with different antennas and send a message for the UE to allocate the plurality of antennas based on the proposed antenna allocation.

Other aspects and features of the present disclosure will become apparent, to those ordinarily skilled in the art, upon review of the following description of the various embodiments of the disclosure.

BRIEF DESCRIPTION OF THE DRAWINGS

Embodiments will now be described with reference to the attached drawings in which.

DETAILED DESCRIPTION OF EMBODIMENTS

Figure 1:
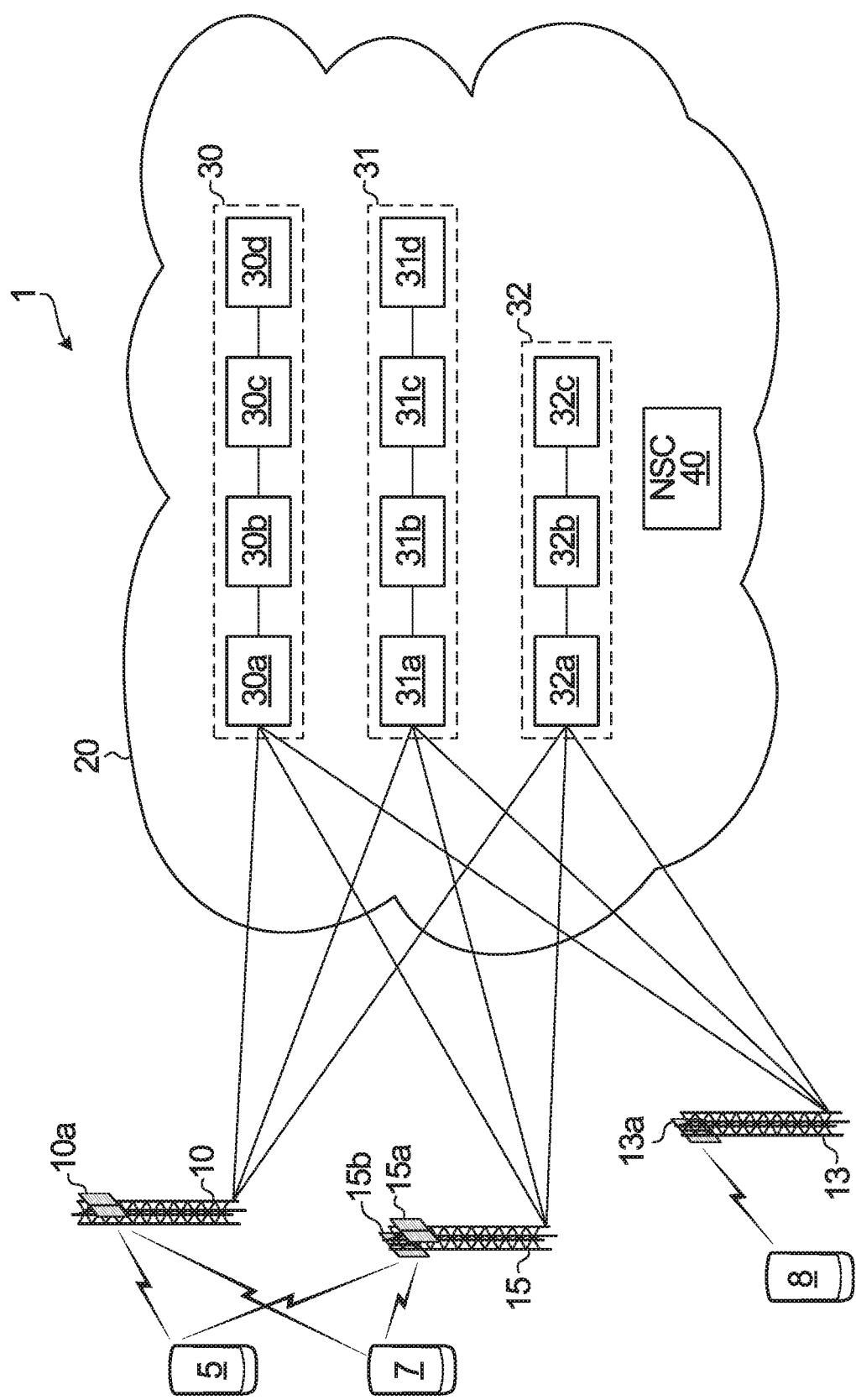
FIG. 1 is a block diagram of a communication network utilizing multiple logical networks to implement network slicing according to an aspect of the invention.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

5G will bring about brand-new applications and experiences. 5G is being envisioned to have characteristics such as, but not limited to, a peak rate of 10 Gbps, ultra-low latency of 1 ms and 100 billion connections. Having such characteristics will require more spectrum, and more importantly, revolutionary innovations in air interface technologies and network architecture.

5G is expected to support multiple services covering enhanced mobile broadband and vertical industries. The services may include, for example, Mobile Broadband Experience Everywhere with more video, higher speeds, and wide scale availability, Massive Machine-type Communication, Mass Market Personalized TV with analysis of user data helping to shape the user experience and Critical Machine Type Communication with remote operation putting both bandwidth and latency demands on the network. These services will have highly diverse requirements. In some proposals, the new 5G network architecture will provide a single physical network using virtual network slicing technology. Virtual network slicing technology will allow networks to be provided that meet different requirements by allocating network resources in logical slices to meet the specific demands (for example, speed, capacity and coverage), service standards and security guarantees of each use case. In the present application, these network resources are referred to as logical networks or network slices.

A particular example of a 5G network architecture includes various network resources needed to provide services to the end user. Examples of network resources may include a mobile fronthaul (MFH) resource, a baseband unit (BBU), a mobile backhaul (MBH) resource and an evolved packet core (EPC) resource. Mobile fronthaul resources provide a connection between a baseband unit and the end user. The mobile fronthaul resources may utilize a centralized radio access network (C-RAN) architecture. In the C-RAN architecture, some of the network control functionality that has previously been located in proximity to an antenna in a cell is moved from the location at the antenna back into the network. A physical communication link that is part of the mobile fronthaul resource may include remote radioheads (RRH) located at one or more antennas. One baseband unit may service multiple remote radioheads located at one or more different antennas. This is one manner in which the architecture may be considered "centralized", as indicated above. The baseband unit performs signal processing functionality and provides a processed signal to the mobile fronthaul resource. In the mobile fronthaul resource, the remote radioheads convert the processed signal from the baseband unit to a radio frequency signal for transmission over the air from the antenna to the user. Mobile backhaul resources provide typical backhaul transport services from the evolved packet core resources to the baseband unit. The evolved packet core resources provide various services that the user may wish to access.

With reference to FIG. 1, an example of a network 1 having a 5G network architecture 1 including multiple logical networks will be described. FIG. 1 shows three UEs 5,7,8, representative of three end users, three antennas 10,13,15, and an abstract representation 20 of three logical networks 30,31,32 existing within the network 1. A first logical network 30 illustrated in FIG. 1 includes MFH resource 30a, BBU resource 30b, MFH resource 30c and a virtualized EPC resource 30d. A second logical network 31 illustrated in FIG. 1 includes MFH resource 31a, a virtualized BBU resource 31b, MFH resource 31c and an EPC resource 31d. A third logical resource 32 illustrated in FIG. 1 includes MFH resource 32a, a virtualized BBU resource 32b, and a virtualized EPC resource 32c. A virtualized version of any of the resources is an emulated version of the resource.

The network 1 may also communicate with other networks that are similar to that illustrated in FIG. 1.

In the example of FIG. 1, the first logical network 30 has the characteristics of being ultra-reliable, having a low bandwidth, and having long range reception. This may be a primary logical network that UEs initially access when accessing the network 1 and is suitable for basic service. The second logical network 31 has the characteristics of having a high bandwidth and having short range reception. This logical network would be used by UEs for services that require a higher bandwidth, such as for video, and are in somewhat close proximity to the access point that the UE uses to access network 1. The third logical network 32 has the characteristics of having a low delay and having low signaling. It is to be understood that these characteristics are merely examples of types of characteristics that may be desirable for the logical networks and is not intended to limit the types of logical networks that could be found in given network The mobile fronthaul resources, baseband unit, mobile backhaul resources and evolved packet resources illustrated in FIG. 1 are representative of network resources, but are implemented in the physical network using hardware, software and combinations thereof. The hardware in the physical network that implements the various resources may, in some situations, be shared by one or more of the logical networks operating in the network architecture.

In FIG. 1, the antennas 10,13,15 and physical links between the antennas 10,13,15 and MFH resources 30a, 31a32a are shown separately from the abstract MFH resources 30a, 31a,32a. As described above, the respective abstract MFH resources 30a, 31a,32a of the logical networks 30,31,32 shown in FIG. 1, when implemented in the physical network, may include these physical links, the antennas and the remote radio heads on the antennas. These links may, for example, be wavelength division multiplexed (WDM) optical links.

The UEs 5,7,8 each have an array of antennas (not shown) for communication with one or more of the logical networks 30,31,32 within network 1. The UEs 5,7,8 have an initial antenna configuration to communicate with a first, or primary, logical network of the plurality of logical networks. Aspects of the application allow the UEs to reconfigure their respective antennas in a dynamic manner to allow connection to additional or fewer logical networks. Changing the configuration of the array of antennas may include changing an existing configuration, or allocation, of the antennas that are currently communicating with a first number of logical networks into a different configuration of antennas for communicating with a second, different second number of logical networks. In some cases this may mean that antennas that were allocated for communicating with a primary logical network are re-allocated for communicating with a second logical network, with other antennas remain in communication with the primary logical network.

UE 5 is communicating with the primary logical network 30 via a first RRH 10*a* of the first antenna 10 and the second logical network 31 via a first RRH 15*a* of a second antenna 15. The array of antennas (not shown) of UE 5 has been configured accordingly to allow communication with the primary and second logical networks 30,31 via the first and second antennas 10,15. UE 7 is communicating with the primary logical network 30 via the first RRH 10*a* of the first antenna 10 and the third logical network 32 via a second RRH 15*b* of the second antenna 15. The array of antennas (not shown) of UE 7 have been configured accordingly to allow communication with the primary and third logical networks 30,32 with the first and second antennas 10,15. UE 8 is communicating with the primary logical network 30 via a first RRH 13*a* of the third antenna 13 and has not yet requested connection to another logical network. The array of antennas (not shown) of UE 8 may all be allocated for communication with the third antenna 13 to allow the best throughput with the primary logical network 30.

The network 1 illustrated in FIG. 1 also includes a network-side controller (NSC) 40, which is involved, in some embodiments, with reconfiguration of UE antennas. The network side controller 40 is a part of the network 1 in the form of hardware, software or a combination of the two. The network-side controller 40 is configured to communicate with the logical networks 30,31,32,33 and the UEs 5,7,8.

In some embodiments the manner in which the antennas of the UEs are configured or reconfigured is in conjunction with the network-side controller. In some embodiments the network-side controller is collocated with a base station, access node or network element implementing the BBU of a network. In some embodiments the network-side controller is collocated with a physical network element that implements a particular component of one or more of the logical networks. In other embodiments the network-side controller is located elsewhere in the network. The network-side controller may communicate with the UE over the network via one or more of the logical networks.

In some embodiments, the network-side controller may initiate the reconfiguration of a UE by monitoring for changes in the usage of the UE. In other embodiments the network-side controller may be accessed by the UE after the UE has initiated reconfiguration of antennas of the UE on its own. Both cases will be described below.

FIG. 1 is intended to capture a particular instant in time in which, for example, UE 8 is still connected to only the primary logical network 30 and other UEs 5,7 are connected to both the primary logical network 30 and at least one other secondary logical network 31,32 based upon the UEs operational requirements at that point in time. FIG. 1 is intended to be a representative example of how UE's may access the logical networks and is not intended to be limiting.

Furthermore, none of the elements in the example should be considered as limiting features, such as the number of UEs, the number of antennas, the number of remote radio-heads on antennas, the number of logical networks in the network, the connectivity of the network resources in the logical networks, the physical components that are used to implement the logical networks, and the number of logical networks that a given UE is in communication with.

Examples described below generally describe operation with respect to a single UE operating in the network which has already been connected to the network. There of course may be multiple such UEs attached to the network operating in a similar manner.

Before reconfiguration of antennas of a UE occurs, it should be noted that in some scenarios initially all antennas of the UE are connected to a primary logical network. This will allow the UE to have an acceptable level of service while in communication the primary logical network. However, it should be understood that it is not necessary for all the antennas of a UE to be connected to the primary logical network when not connected to other logical networks. In some situations the UE is connected to the primary logical network with less than all of the antennas of the UE. In some situations, the UE may be connected to the primary logical network as well as one or more other logical networks and when the UE is about to connect to a further logical network.

Reconfiguration of a current allocation of antennas may be initiated when operating conditions change for the UE, for example when the usage of the UE changes or when the location of the UE changes. In some instances the UE may want to allocate more or less antennas to the primary logical network. This may result from the UE being closer to or farther away from a transmitter and thus the number of antennas may be changed to maintain a particular level of service. In some instances the UE may want to access a logical network that can provide a particular level of service for a particular application, such as video, which is better than can be provided by the primary network slice for the particular application at that particular time and for the physical location of the UE.

In some embodiments, the UE may initiate reconfiguration of the antennas. Based on a change of operating conditions, the UE may determine that a reconfiguration is desirable. The UE may propose a reconfiguration of the antennas, but not implement the reconfiguration before contacting the network-side controller to confirm that the reconfiguration is authorized or approved by the network-side controller. In some embodiments the UE may propose a reconfiguration of the antennas and then implement the reconfiguration before contacting the network-side controller to confirm that the reconfiguration is authorized or approved by the network-side controller. The UE may propose the reconfiguration based on the UE's knowledge of the network that it has been provided by the network and possibly more particularly by the network-side controller as well as based on the UE's understanding of the UE's own properties. For example, the network-side controller may provide the UE information regarding what logical networks are available to the UE. The UE may also perform analysis of the proposed reconfiguration of the antennas in an attempt to ensure that once the reconfiguration of antennas is implemented, communication the any logical networks meet established service standards. Details of such analysis will be described in more detail below.

Alternatively to the UE determining that reconfiguration is desirable and sending a network-side controller a proposed allocation, the network-side controller may initiate the reconfiguration of the UE antennas as a result of the network-side controller detecting a change in conditions of the UE. In response to the detected change, the network-side controller sends a command to the UE, via the primary logical network, to reconfigure the antennas so that some of the antennas remain connected to the primary logical network and some of the antennas will be connected to some other logical network. In some embodiments the UE determines an allocation for reconfiguring the antennas. In some embodiments the network side controller proposes which antennas should be allocated to which logical networks.

Whether the UE or the network-side controller is responsible for initiating reconfiguration of the antennas, once it is determined that a new antenna configuration is needed and the UE is responsible for reconfiguring the antennas, one manner in which the UE allocates the antennas for respective network slices is by selecting a predetermined antenna configuration for the desired number of logical networks, i.e. the number of logical networks that the UE is currently connected to plus an additional logical network that the UE is expecting to connect. Another manner in which the UE makes the determination is by performing a dynamic allocation by selecting particular antennas for use with each of the logical networks that the UE is currently connected to, plus an additional logical network that the UE is expecting to connect. Such a decision may be based on which antennas are currently connected to which logical networks.

Other factors that may affect the UE's allocation of the antennas for respective network slices include, but are not limited to, the usage of the UE, the network slices that are available, the network slices that are designated for use, the network slices that are capable of being used by a given UE, a service plan of the UE (bandwidth size and speed allocations for example), network policies such as a network bandwidth requirement, a network delay requirement, a network delay variation requirement, a network security requirement and a network privacy requirement, among other parameters. In some embodiments, the UE is able to select from a variety of available network slices that may meet the UE's requirements.

If the network-side controller is responsible for selecting the antenna configuration and proposed the antenna configuration to the UE, the network-side controller may make the determination of the configuration in similar ways to that of the UE when the UE makes the determination of the configuration.

After the determination is made regarding the allocation, but before the UE implements the reconfiguration of the antennas based on the reconfiguration selection, analysis of the reconfiguration in the form of one or more tests may be performed in order to attempt to determine that at least the connection to the primary logical network still provides a level of service that is above a desired threshold and service to any other existing logical networks or new connections to logical networks meet a desired service standard. In some embodiments, the one or more test may be performed in order to attempt to determine that the primary logical network and an additional logical network that the UE is expecting to connect with still provide a level of service that is above a desired threshold. In some embodiments, the one or more test may be performed in order to attempt to determine that the primary logical network, any other logical networks that the UE is connected to and an additional logical network that the UE is expecting to connect with still provide a level of service that is above a desired threshold.

The one or more test may for example include performing a calculation to determine that the interference between transmitted and/or received signals of respective pairs of signals from corresponding logical networks is below a threshold. As an example, if the UE was already connected to the primary logical network and a second logical network and plans to connect to a third logical network, it may attempt to determine the interference between pairs of the primary and second logical networks, primary and the new third logical networks and the second and new third logical networks. Determining interference that may occur between signals of pairs of logical networks may include, for example, considering the distances between antennas in the antenna array that are used for communicating with the pairs of logical networks. Determining interference that may occur between signals of pairs of logical networks may also include performing run time testing or emulation about antenna interference. In some implementations interference may be determined between more than only pairs of signals from different logical networks, up to and including all of the antenna combinations simultaneously. In some embodiments, information about antenna interference could be preloaded on the UE such that when proposed antenna allocations are identified, interference for the proposed allocations are used to identify the preloaded interference values that would be applicable.

The one or more test generally include tests that could be performed by the UE without implementing reconfiguration of the antenna array in the proposed manner, as this could potentially disrupt the existing level of service provided by the UE.

The tests above could be done by the UE when the UE makes a proposal for allocating the antennas before the UE communicates the proposal to the network-side controller. The tests above could be done by the UE when the UE makes a proposal for allocating the antennas in response to the network-side controller requesting the reconfiguration occur. The tests above could be done by the network controller, if the network controller has adequate information about UE, for example antenna layout, before the network-side controller makes a determination about how the antennas should be configured.

Figure 2:
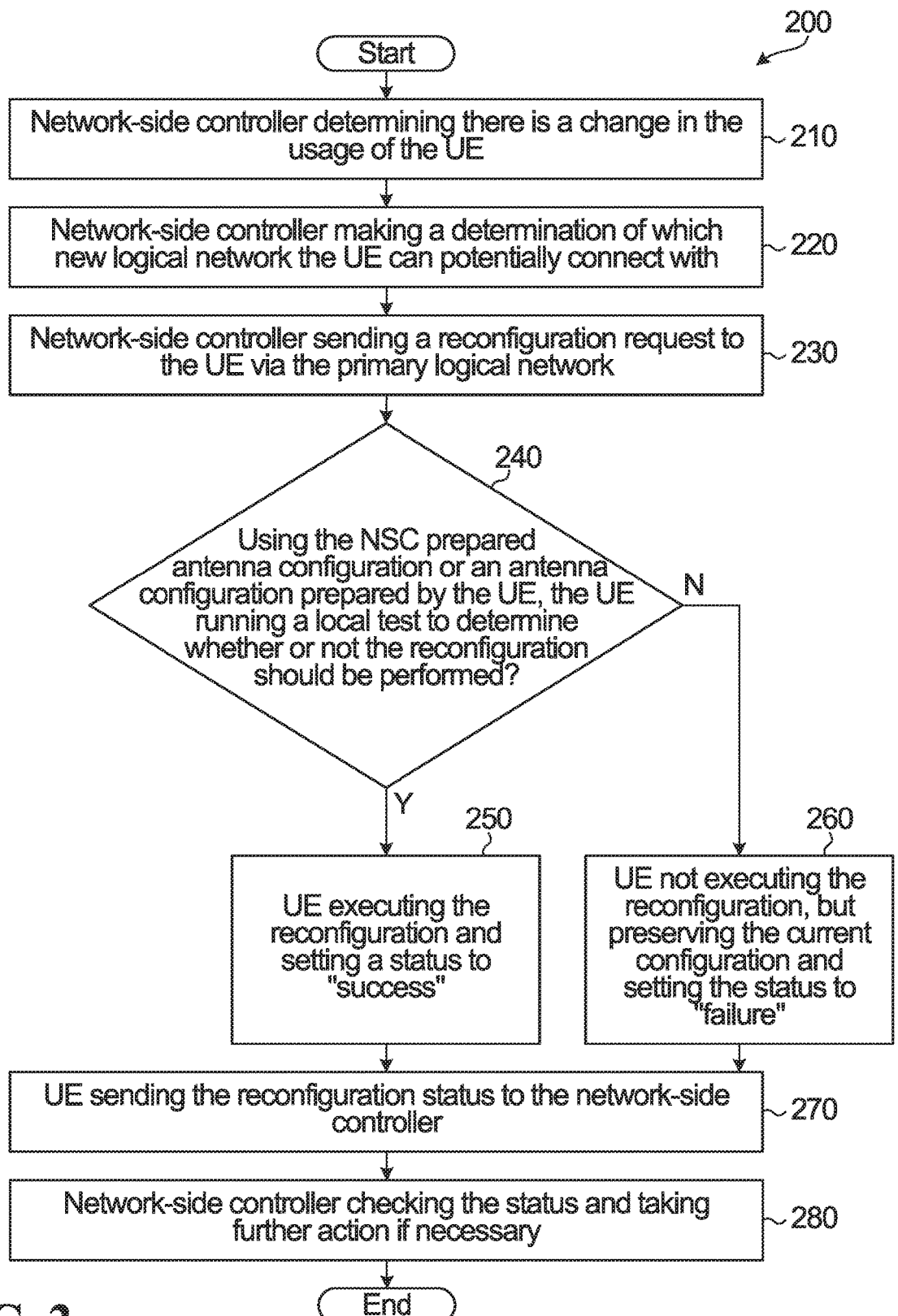
FIG. 2 illustrates a method in a system including a UE and network-side controller according to an embodiment of the present invention.

Referring to FIG. 2, the following describes an example method 200 for configuring antennas of a UE where a network-side controller is used to determine that the UE should reconfigure its antennas and includes steps performed by both the network-side controller. It is assumed in this example that the UE is already connected to the primary logical network. As indicated above, the network-side controller is somewhere on the network side, not necessarily collated with the primary logical network. In a first step 210, the network-side controller determines there is a change in the usage of the UE. This may be the result of the UE reporting a change in its usage to the controller over the primary logical network or the network-side controller detecting a usage change in the UE. In step 220, the network-side controller makes a determination of which new logical network the UE can potentially connect with. The determination may be based on the usage of the UE and other parameters (e.g., the UE mobile plan). In step 230, the network-side controller sends a reconfiguration request to the UE via the primary logical network. The network-side controller may propose a reconfiguration of the antenna to connect to a new logical network and maintain connection with the primary logical network. In some embodiments the request may simply be a number of antennas to be used to connect to the new logical network. In some embodiments the request may be an indication that the UE is to propose an antenna configuration to the network-side controller. In step 240, the UE considers the reconfiguration proposed by the network-side controller or proposes its own configuration based on the network-side controller's request for reconfiguration. The UE runs a local test, as described above, on the device to determine whether or not the proposed reconfiguration should be implemented. If yes, at step 250 the UE executes the reconfiguration and may for example set a status of "success". Otherwise, if no, at step 260 the UE does not execute the reconfiguration, but preserves the current configuration and sets a status of "failure". At step 270, the UE sends the reconfiguration status to the network-side controller. At step 280, the network-side controller checks the status and may take further action, if necessary. For example, if the reconfiguration was not successful, the network-side controller may propose an alternative antenna configuration for the UE, and at least some of steps 230 to 280 could be repeated. In some embodiments, the UE sends its current configuration of antennas to the network-side controller either periodically or sporadically.

Figure 3:
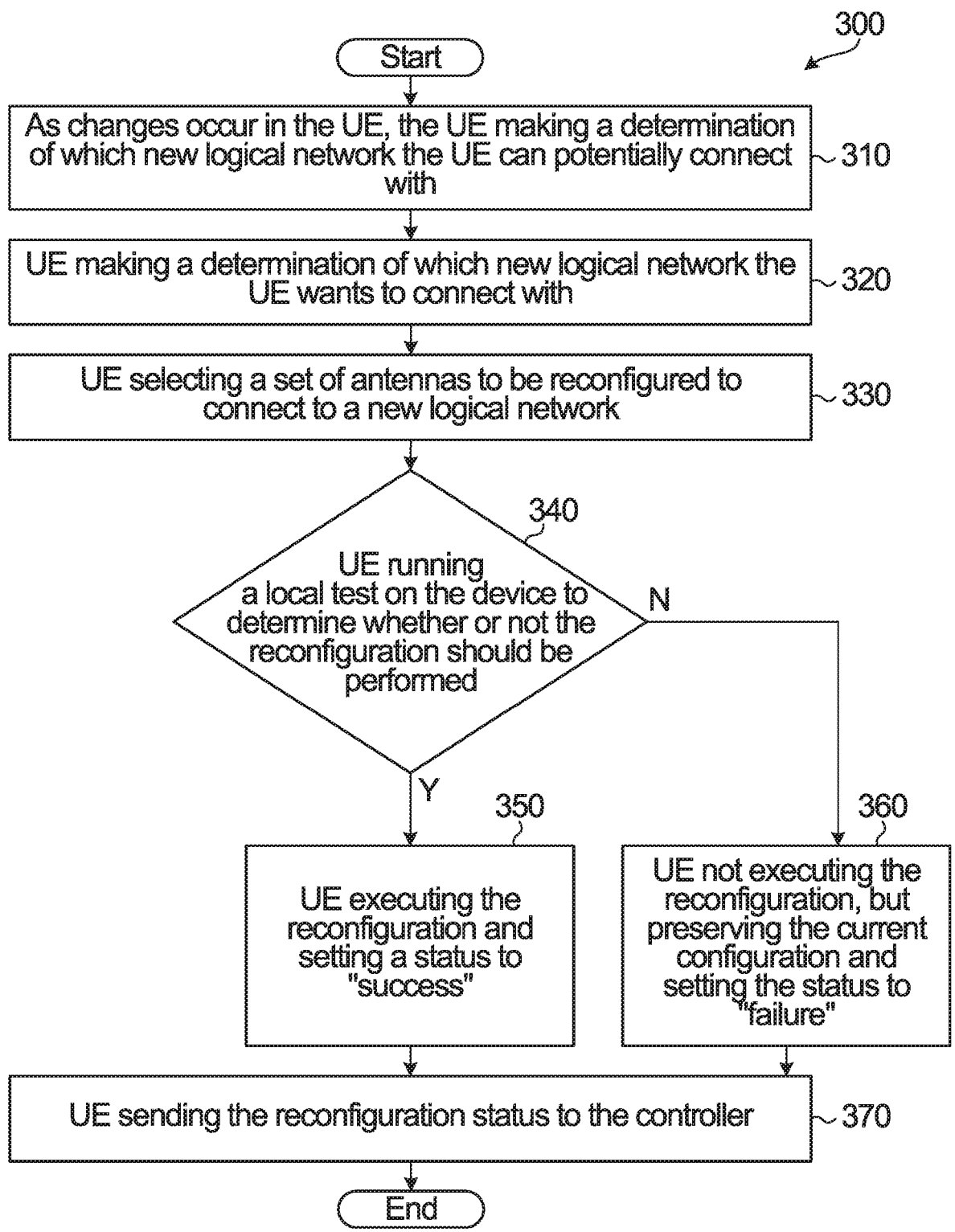
FIG. 3 illustrates another method in a system including a UE and network-side controller according to an embodiment of the present invention.

Referring to FIG. 3, the following describes an example method 300 for configuring antennas of a UE where the UE determines that it should reconfigure its antennas. Once again, it is assumed for this example that the UE is already connect to the primary logical network. Furthermore, it is assumed that the UE knows what additional logical networks it can access, or can inquire with the primary logical network which additional logical networks it can access. The UE may also be sending periodic or sporadic reports of changes in its usage to the network-side controller and periodic or sporadic reports of its antenna configuration to the network-side controller. The network-side controller is somewhere on the network side, not necessarily collated with the primary logical network. In step 310, as changes occur in the UE, the UE makes a determination of which new logical network the UE can potentially connect with. For example, based on characteristics such as the UE service plan, what logical networks may be currently available, which if any logical networks may be off limits to the UE, etc. In step 320, the UE makes a determination of which new logical network the UE wants to connect with. Such a decision may be made based on the UE's knowledge of the available logical networks and requirements for a logical network, or it may be made by a user of the UE accessing, for example, a list of logical networks displayed on a user interface of the UE. The determination may be based on the usage of the UE and other parameters (e.g., the UE mobile plan). In step 330, the UE selects a set of antennas to be reconfigured to connect to a new logical network. In step 340, the UE runs a local test on the device to determine whether or not the reconfiguration should be performed. If yes, at step 350, the UE executes the reconfiguration and may for example set a status to "success". Otherwise, if no, at step 360, the UE does not execute the reconfiguration, but preserves the current configuration and set the status to "failure". At step 370, the UE sends the reconfiguration status to the controller, which includes which antennas are connected to which logical networks. If the reconfiguration was not successful, the UE may propose an alternative antenna configuration for the UE and at least some of steps 320 to 370 could be repeated.

Figure 4:
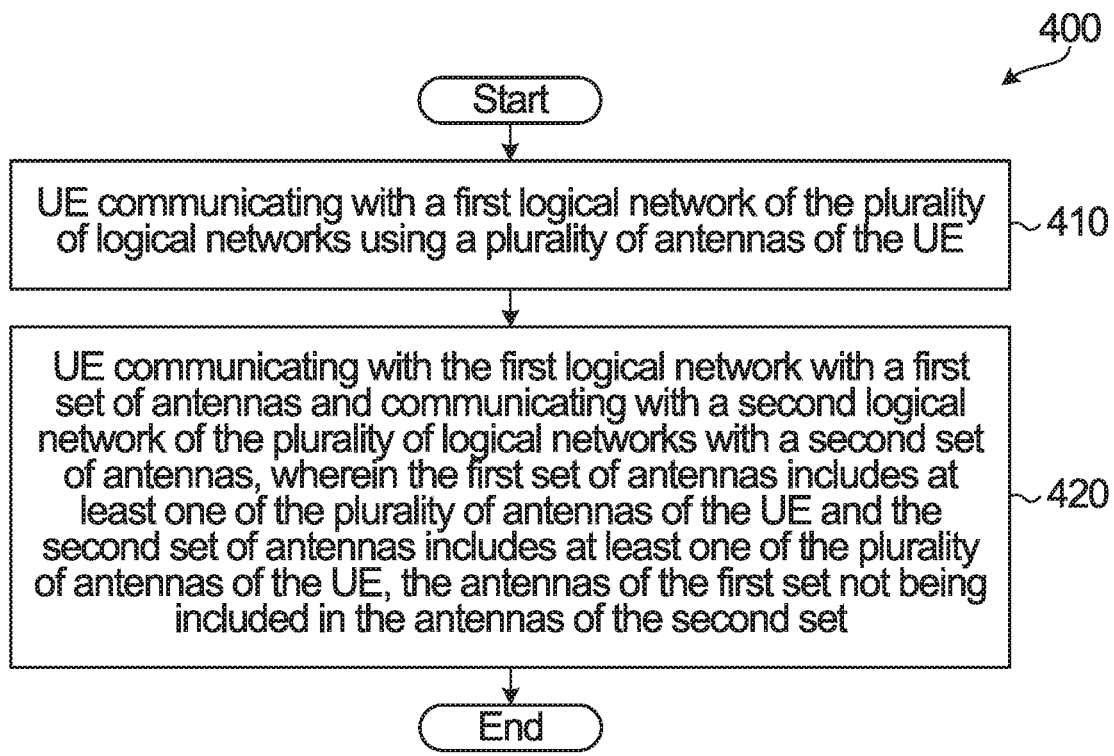
FIG. 4 illustrates a method for use in a UE according to an embodiment of the present invention.

Referring to FIG. 4, the following describes a more general example of a method 400 that is performed in a UE. A first step 410 of the method includes the UE communicating with a network including a plurality of logical networks, the UE communicating with a first logical network of the plurality of logical networks using a plurality of antennas of the UE. The plurality of the antennas with which the UE is communicating with the first logical network does not necessarily include all of the antennas of the UE. Some of the antennas of the UE may not be used for one reason or another. In some embodiments however, all of the antennas may be used. The plurality of antennas of the UE comprises In a second step 420, the UE communicates with the first logical network with a first set of antennas and communicates with a second logical network of the plurality of logical networks with a second set of antennas, the first set of antennas includes at least one of the plurality of antennas of the UE and a second set of antennas includes at least one of the plurality of antennas of the UE, the antennas of the first set not being included in the antennas of the second set. As part of the transition from using the plurality of antenna to communicate with the first logical network to using the first set of antenna to communicate with the first logical network and the second set of antennas to communicate with the second logical network, the UE may allocate the plurality of antennas with which the UE is using to communicate with the first logical network, whether it is some or all of the total number of antennas, in such a manner that at least one of the antennas that is being used for communication with the first logical network is now being proposed for use with a different logical network. As such the antennas are considered to be dynamically allocated.

While the above description refers in particular to first and second logical networks, it is to be understood that in some scenarios the UE is connected to multiple logical networks, one of which is the first logical network, and the second logical network is a new logical network that the UE desires to connect with.

In some embodiments, the UE may determine whether the first set of antennas of the UE communicating with the first logical network and the second set of antennas of the UE communicating with the second logical network provides an acceptable level of service for each of the first and second logical networks. Determining if the first and second logical networks will provide an acceptable level of service may include performing some form of analysis on the UE itself before the reconfiguration is implemented. This may be done in an attempt to maintain a baseline threshold of performance of the UE with each network it is connected with, including any additional logical networks it is going to connect with. In some embodiments, when the UE determines that the level of service is acceptable, the UE transmits an indication of an allocation of the plurality of antennas to a network-side controller.

In some embodiments, if the UE determines that the level of service for each of the first and second logical networks is acceptable, then the UE allocates the plurality of antennas of the UE into a first set of antennas that includes at least one of the plurality of antennas of the UE and a second set of antennas that includes at least one of the plurality of antennas of the UE. Alternatively, if the UE determines that the level of service is not acceptable, then the UE maintains an existing antenna configuration. In some embodiments, there may be some level of prioritization with regard to maintaining service, when the UE is connected to multiple logical networks. This may, for example, allow a new network connection to have a higher priority over an existing connection and thus the existing connection may be dropped. In such a scenario, a connection to certain logical networks could be dropped, but others would be maintained, in order to make a new connection. This could be implemented by having the user of the UE authorize the drop on a display of the UE.

In some embodiments, before the UE allocates the plurality of antennas of the UE into the first and second sets of antennas, the UE receives a request to allocate the at least one antenna of the plurality of antennas for communicating with the second logical network. Then, in response to the request, the UE performs the allocating. The UE may receive the request from the network-side, such as from a network-side controller or from a user of the UE. The request from the user may be an indirect request, such as the user making a request of the UE for content, for example, to download a software app or watch a video, which forces the UE to connect to a new logical network to access the requested content.

In some embodiments, the UE transmits an indication of a change of usage of the UE to the network-side controller. As a result of the change of usage, the UE may receive the request to allocate at least one antenna for communicating with the second logical network. In response to the request, the UE performs the allocating of the antennas. In some embodiments, receiving the request includes receiving an indication of a number of antennas that should be allocated by the UE for communicating with the second logical network. In some embodiments, receiving the request includes receiving a proposed antenna configuration.

In some embodiments, after the UE has received the request and determined that the reconfiguration would meet an acceptable level of service, the UE forwards an indication to the network-side controller that the reconfiguration would be acceptable. In some embodiments, the UE may eventually receive confirmation from the network-side controller to allocate the plurality of antennas into the first set of antennas for communicating with the first logical network and the second set of antennas for communicating with the second logical network. In some embodiments, the UE may proceed to allocate the antennas without receiving confirmation from the network-side controller.

In some embodiments, the UE transmits an indication of a current allocation of the plurality of antennas to the network side controller. The definition of plurality of antennas may include all of the antennas, or if not all antennas are allocated for use or are not all being used, then the indication may be an indication of which antennas are currently allocated to which logical networks.

Figure 5:
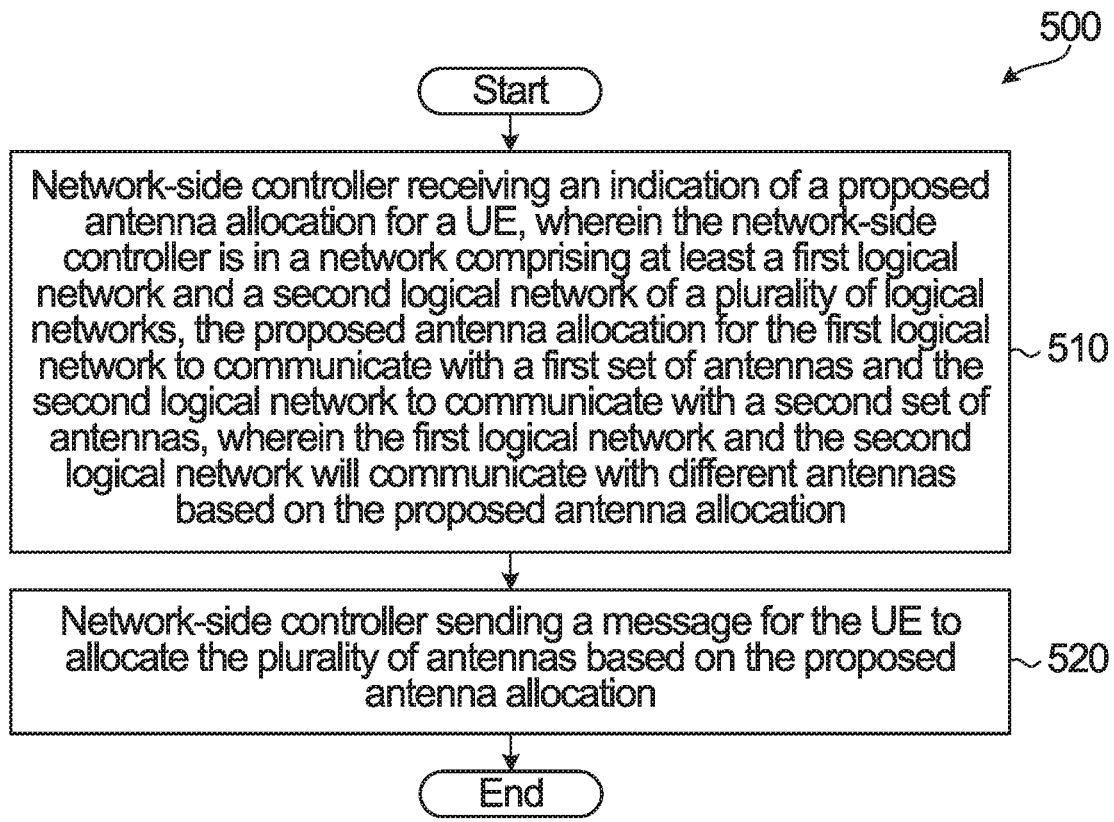
FIG. 5 illustrates a method for use in a network-side controller according to an embodiment of the present invention.

Referring to FIG. 5, the following describes a general example of a method 500 that is performed in a network-side controller. A first step 510 of the method includes the network-side controller receiving an indication of a proposed antenna allocation for a UE, in which the UE is currently communicating with a first logical network using a plurality of antennas of the UE. The network-side controller is in a network comprising at least a first logical network and a second logical network of a plurality of logical networks, the proposed antenna allocation for first logical network to communicate with a first set of antennas and the second logical network to communicate with a second set of antennas, wherein the first logical network and the second logical network communicate with different antennas based on the proposed antenna allocation. The proposed antenna allocation includes the first set of antennas that includes at least one of the plurality of antennas and the second set of antennas that includes at least one of the plurality of antennas, the antennas of the first set not being included in the antennas of the second set. A second step 520 includes the network-side controller sending a message for the UE to allocate the plurality of antennas based on the proposed antenna allocation.

Steps 510 and 520 may occur for example when the network-side controller is being proactive in the reconfiguration of the antennas or when the UE is the initiator in the reconfiguration. If the network-side controller is being proactive, then additional steps may be performed by the network-side controller, as discussed below, prior to receiving the indication of the proposed antenna allocation.

In some embodiments, for example, prior to the network-side controller receiving an indication of a proposed antenna allocation for a UE, the network-side controller sends a request to allocate the at least one antenna of the plurality of antennas for communicating with the second logical network. In some embodiments, sending the request may include sending an indication of a number of antennas that should be allocated on the UE for communication with the second logical network. In some embodiments the request includes a proposed antenna allocation In some embodiments, the network-side controller may also detect a change of usage of the UE. In response to detecting the change, the network-side controller sends the request to allocate the at least one antenna of the plurality of antennas for communication with the second logical network.

In some embodiments, detecting a change of usage of the UE includes the network-side controller receiving an indication of a change of usage of the UE from the UE.

In some embodiments, the network-side controller receives an indication of a current allocation of the plurality of antennas. Such an indication may be received sporadically or periodically from the UE. In some embodiments, the network-side controller may send the request to the UE to allocate the at least one antenna for communicating with the second logical network in response to the network-side controller receiving an indication of a current allocation of the plurality of antennas.

In some embodiments, the network-side controller selects the second logical network for use by the UE based on one or more parameters of the UE, including but not limited to, a service plan of the UE, a bandwidth requirement, a delay requirement, a delay variation requirement, a security requirement and a privacy requirement.

Figure 6:
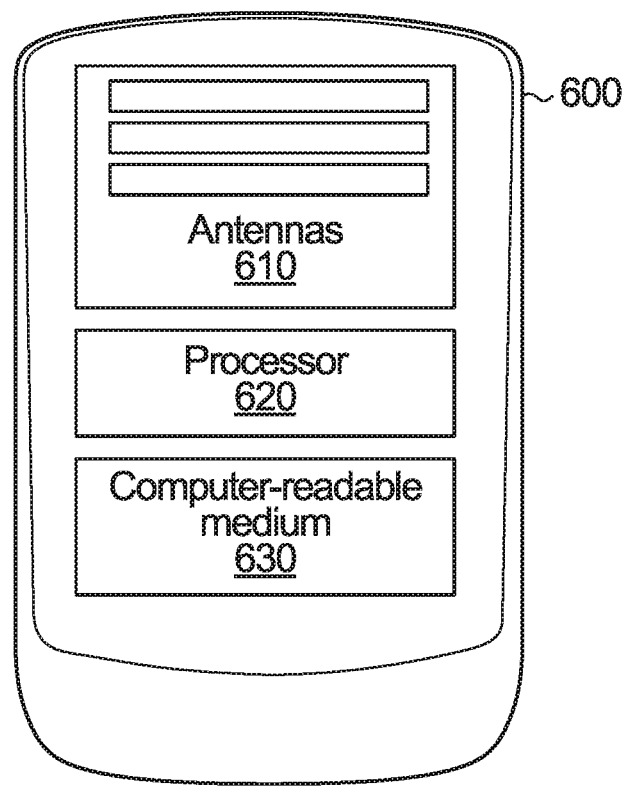
FIG. 6 is a block diagram of a UE according to an aspect of the invention.

Referring to FIG. 6, a UE with a configurable array of a plurality of antennas will now be described. It is to be understood that the UE could be in communication with a network-side controller and one or more logical networks at any given time. As well as the particular elements identified below, it is also to be understood that the UE has other elements that would be needed for normal operation, such as for example a display to enable a user to interact with the UE, a speaker and/or microphone, a power supply and other elements.

The UE 600 includes a plurality of antennas 610. The plurality of antennas 610 is dynamically configurable to communicate with one or more logical networks. The UE 600 also includes a processor 620 and a computer-readable medium 630 having stored thereon instructions that when executed by the processor cause the UE to perform a series of actions. The actions may include communicating with a first logical network using a subset of the plurality of antennas of the UE and communicating with the first logical network with a first set of antennas and communicating with a second logical network with a second set of antennas, wherein the first set of antennas includes at least one of the subset of the plurality of antennas and the second set of antennas includes at least one of the subset of the plurality of antennas, the antennas of the first set not being included in the antennas of the second set.

A further action may include determining whether the first set of antennas communicating with the first logical network and the second set of antennas communicating with the second logical network provide an acceptable level of service for each of the first and second logical networks.

A further action may include, if the UE determines that the level of service for each of the first and second logical networks is acceptable, allocate the plurality of antennas of the UE into the first set of antennas that includes at least one of the plurality of antennas of the UE and the second set of antennas that includes at least one of the plurality of antennas of the UE and if the UE determines that the level of service is not acceptable, maintain an existing antenna configuration.

The computer-readable medium may include instructions for performing the actions described above.

Figure 7:
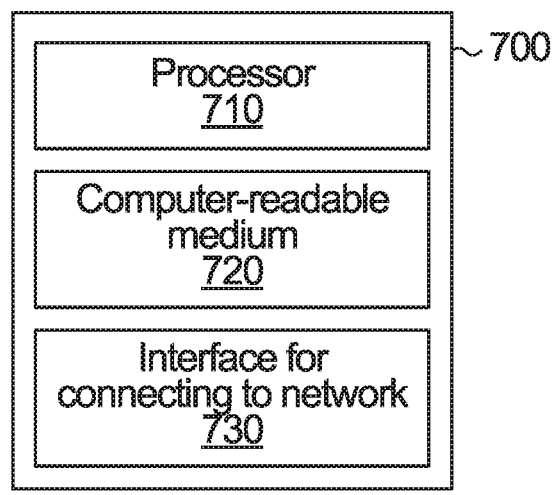
FIG. 7 is block diagram of a network-side controller according to an aspect of the invention.

Referring to FIG. 7, a network-side controller for configuring antennas of a UE having a plurality of antennas will now be described. It is to be understood that such a network-side controller could be in communication with multiple UEs or no UE at a given time. As well as the particular elements identified below, it is also to be understood that the network-side controller has other elements that would be needed for normal operation, such as for example a power supply and other elements.

The network-side controller 700 includes a processor 710 and a computer-readable medium 720 having stored thereon instructions that when executed by the processor cause the network-side controller to perform a series of actions. The network-side controller 700 is in a network comprising at least a first logical network and a second logical network of a plurality of logical networks. A first action may be to receive an indication of a proposed antenna allocation for the UE, the UE currently communicating with a first logical network using a plurality of antennas of the UE. The proposed antenna allocation for the first logical network to communicate with a first set of antennas and the second logical network to communicate with a second set of antennas, wherein the first logical network and the second logical network communicate with different antennas. The proposed antenna allocation comprises the first set of antennas that includes at least one of the plurality of antennas and the second set of antennas that includes at least one of the plurality of antennas, the antennas of the first set not being included in the antennas of the second set. A second action includes sending a message for the UE to allocate the plurality of antennas based on the proposed antenna allocation.

The network-side controller 700 also includes an interface 730. Interface 730 is for allowing the network-side controller 700 to connect to the UE via one of the logical networks. The manner of communication may be wired or wireless depending on how the network-side controller communicates with the UE and logical networks.

In some embodiments, the instructions executed by the processor further cause the network-side controller to send a request to the UE to allocate at least one antenna of the plurality of antennas for communication with the second logical network. In some embodiments, the instructions executed by the processor further cause the network-side controller to send an indication of a number of antennas that should be allocated for communication with the second logical network.

In some embodiments, the instructions executed by the processor further cause the network-side controller to detect a change of usage of the UE and in response to detection of the change, send the UE the request to allocate the at least one antenna of the plurality of antennas for communication with the second logical network.

In some embodiments, the instructions executed by the processor further cause the network-side controller to receive an indication a change of usage of the UE from the UE, and in response to receiving the indication of the change, send the UE the request to allocate the at least one antenna of the plurality of antennas for communication with the second logical network.

In some embodiments, the instructions executed by the processor further cause the network-side controller to receive an indication of a change of usage of the UE.

In some embodiments, the instructions executed by the processor further cause the network-side controller to receive an indication of a current allocation of the plurality of antennas.

In some embodiments, the instructions executed by the processor further cause the network-side controller to select the second logical network based on one or more parameters of the UE.

Numerous modifications and variations of the present disclosure are possible in light of the above teachings. It is therefore to be understood that within the scope of the appended claims, the disclosure may be practised otherwise than as specifically described herein.

We claim:

1. A method in a user equipment (UE), the method comprising:

the UE communicating via at least one first type of access point with a single physical network including a plurality of logical networks, the UE communicating with a first logical network of the plurality of logical networks using a plurality of antennas of the UE;

the UE communicating with the first logical network with a first set of antennas and communicating via at least one access point of the first type of access point with a second logical network of the plurality of logical networks with a second set of antennas, wherein the first set of antennas includes at least one of the plurality of antennas of the UE and the second set of antennas includes at least one of the plurality of antennas of the UE, the antennas of the first set not being included in the antennas of the second set; and determining, by the UE, whether the first set of antennas communicating with the first logical network and the second set of antennas communicating with the second logical network provides an acceptable level of service for each of the first and second logical networks.

2. The method of claim 1 further comprising:

if the UE determines that the level of service for each of the first and second logical networks is acceptable, the UE allocating the plurality of antennas of the UE into the first set of antennas that includes at least one of the plurality of antennas of the UE and the second set of antennas that includes at least one of the plurality of antennas of the UE; and if the UE determines that the level of service is not acceptable, the UE maintaining an existing antenna configuration.

3. The method of claim 2, further comprising:

if the UE determines that the level of service is acceptable, the UE transmitting an indication of an allocation of the plurality of antennas to a network-side controller.

4. The method of claim 1 further comprising:

the UE receiving a request from the network to allocate the at least one antenna of the plurality of antennas for communicating with the second logical network; in response to the request, the UE performing said allocating.

5. The method of claim 1 further comprising:

the UE transmitting an indication to the network of a change of usage of the UE;

the UE receiving a request from the network to allocate the at least one antenna of the plurality of antennas for communicating with the second logical network; and in response to the request, the UE performing said allocating.

6. The method of claim 5, wherein receiving the request to allocate the at least one antenna of the plurality of antennas for communication with the second logical network comprises:
receiving an indication of a number of antennas that should be allocated for communicating with the second logical network.

7. The method of claim 1, wherein the UE determining whether the first set of antennas communicating with the first logical network and the second set of antennas communicating with and the second logical network provides an acceptable level of service comprises:
estimating interference between the first set of antennas and the second set of antennas.

8. The method of claim 1, further comprising:
the UE allocating the plurality of antennas of the UE into at least three sets of antennas, wherein each set of antennas includes at least one of the plurality of antennas, and the antennas of each set are not included in the antennas of any other set; and
the UE communicating with the first logical network with the first set of antennas of the at least three sets of antennas and communicating with two or more second logical networks of the plurality of logical networks with a respective set of the remaining sets of antennas.

9. A user equipment (UE) comprising:
a plurality of antennas, the plurality of antennas being configured to communicate with a single physical network including one or more logical networks;
a processor;
a computer-readable medium having stored thereon instructions that when executed by the processor cause the UE to:
communicate via at least one first type of access point with a first logical network using a subset of the plurality of antennas of the UE; and
communicate with the first logical network with a first set of antennas and communicating via at least one access point of the first type of access point with a second logical network with a second set of antennas, wherein the first set of antennas includes at least one of the subset of the plurality of antennas and the second set of antennas includes at least one of the subset of the plurality of antennas, the antennas of the first set not being included in the antennas of the second set; and
determine whether the first set of antennas communicating with the first logical network and the second set of antennas communicating with the second logical network provide an acceptable level of service for each of the first and second logical networks.

10. The UE of claim 9, wherein the computer-readable medium further comprises instructions that when executed by the processor cause the UE to:
if the UE determines that the level of service for each of the first and second logical networks is acceptable, allocate the plurality of antennas of the UE into the first set of antennas that includes at least one of the plurality of antennas of the UE and the second set of antennas that includes at least one of the plurality of antennas of the UE; and
if the UE determines that the level of service is not acceptable, maintain an existing antenna configuration.

11. A method comprising:
a network-side controller receiving an indication of a proposed antenna allocation for a user equipment (UE), wherein the network-side controller is in a single physical network comprising at least a first logical network and a second logical network of a plurality of logical networks, the proposed antenna allocation for the first logical network to communicate with a first set of antennas via at least one first type of access point and the second logical network to communicate with a second set of antennas via at least one access point of the first type of access point, wherein the first logical network and the second logical network communicate with different antennas based on the proposed antenna allocation;
the network-side controller sending a message for the UE to allocate the plurality of antennas based on the proposed antenna allocation;
the network-side controller receiving an indication of a change of usage of the UE from the UE; and in response to receiving the indication of the change, the network-side controller sending a request to allocate the at least one antenna of the plurality of antennas for communication with the second logical network.

12. The method of claim 11 further comprising:
the network-side controller receiving an indication of a current allocation of the plurality of antennas; and
the network-side controller sending a request to allocate the at least one antenna of the plurality of antennas for communicating with the second logical network.

13. The method of claim 11 further comprising:
the network-side controller selecting the second logical network based on one or more parameters of the UE, wherein the one or more parameters of the UE include one or more of a service plan of the UE, a bandwidth requirement, a delay requirement, a delay variation requirement, a security requirement and a privacy requirement.

14. The method of claim 11 wherein sending the request to allocate the at least one antenna of the plurality of antennas for communication with a second logical network comprises sending an indication of a number of antennas that should be allocated for communication with the second logical network.

15. A network-side controller for configuring antennas of a user equipment (UE) having a plurality of antennas, the network-side controller comprising:
a processor;
a computer-readable medium having stored thereon instructions that when executed by the processor cause the network-side controller to:
receive an indication of a proposed antenna allocation for the UE, wherein the network-side controller is in a single physical network comprising at least a first logical network and a second logical network of a plurality of logical networks, the proposed antenna allocation for the first logical network to communicate via at least one first type of access point with a first set of antennas and the second logical network to communicate via at least one access point of the first type of access point with a second set of antennas, wherein the first logical network and the second logical network communicating with different antennas based on the proposed antenna allocation;
send a message for the UE to allocate the plurality of antennas based on the proposed antenna allocation;
detect a change of usage of the UE; and in response to detection of the change, send the UE a request to allocate the at least one antenna of the plurality of antennas for communication with the second logical network.

16. The network-side controller of claim 15 wherein the instructions executed by the processor further cause the network-side controller to: receive an indication of a change of usage of the UE or an indication of a current allocation of the plurality of antennas.

17. The network-side controller of claim 15 wherein the instructions executed by the processor further cause the network-side controller to:
   select the second logical network based on one or more parameters of the UE.

18. The network-side controller of claim 15 wherein the instructions executed by the processor further cause the network-side controller to: send an indication of a number of antennas that should be allocated for communication with the second logical network.

* * * * *